April 4, 1939.   J. B. NELSON   2,153,153
SHUTTER REBOUND STOP
Filed Dec. 8, 1937
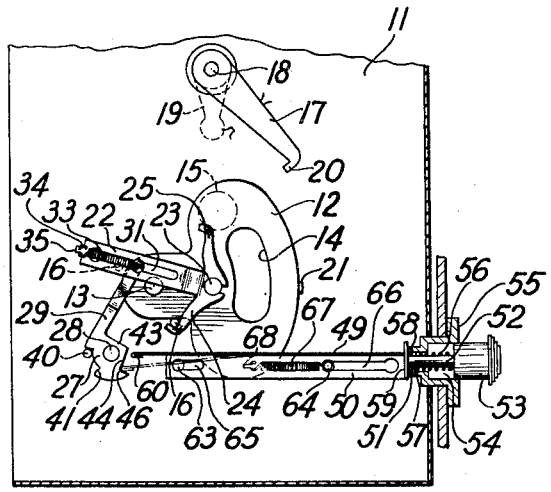
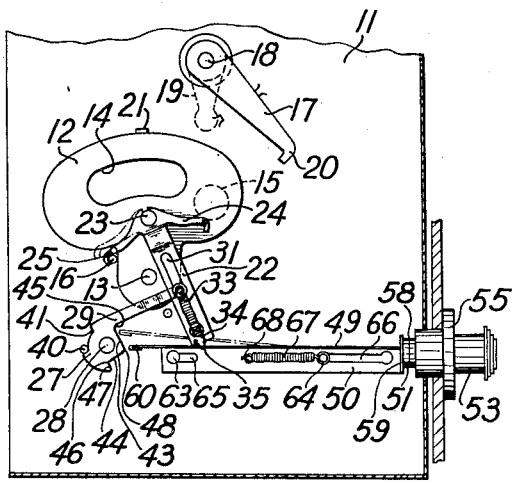
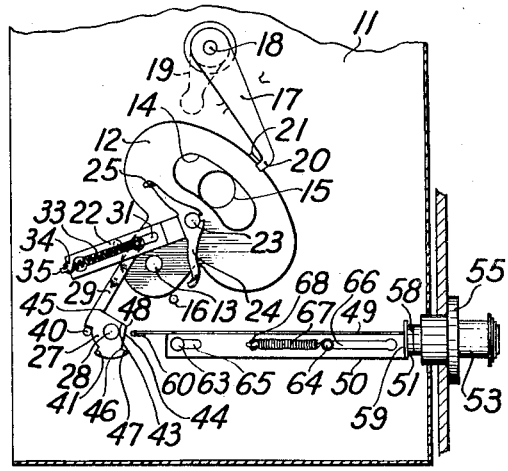
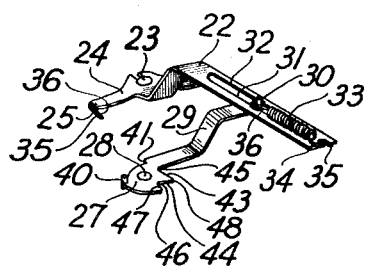
John B. Nelson
INVENTOR
BY
ATTORNEYS Patented Apr. 4, 1939

2,153,153

UNITED STATES PATENT OFFICE 2,153,153

SHUTTER REBOUND STOP

John B. Nelson, Rochester, N. Y., assignor to Eastman Kodak Company, Rochester, N. Y., a corporation of New Jersey Application December 8, 1937, Serial No. 178,785

10 Claims. (Cl. 95—59)

The invention relates to improvements in photographic shutters of the single action type which are adapted to be oscillated to make an exposure, and more particularly to an arrangement for preventing rebound of the shutter after an instantaneous exposure has been made.

One object of the invention is the provision of an improved shutter of the single action type in which rebound of the shutter is prevented after an instantaneous exposure has been made.

Another object of the invention is the provision of a shutter rebound stop which is positive in its action, simple in construction, and inexpensive to manufacture.

To these and other ends, the invention resides in certain improvements and combinations of parts, all as will be hereinafter more fully described, the novel features being pointed out in the claims at the end of the specification.

In the drawing:

Fig. 1 is a plan view of a shutter operating mechanism, and a rebound stop constructed in accordance with the preferred embodiment of the invention, showing the relation of the various parts;

Fig. 2 is a view similar to Fig. 1, but with the parts in a different position such as would be the case after a shutter, as shown in Fig. 1 has been moved to take an exposure;

Fig. 3 is a view similar to Figs. 1 and 2, showing an arrangement for arresting the movement of the shutter to permit the taking of time exposures;

Fig. 4 is a perspective view of the shutter operating mechanism, showing the relation of the parts; and Fig. 5 is an enlarged perspective view of the hooked end of the shutter actuating member, showing the arrangement by which the member is locked after the completing of an exposure to prevent shutter rebound.

Similar reference numerals throughout the various views indicate the same parts.

In photographic cameras, a shutter is used to control the admission of light through the lens to the sensitized image receiving material. In the less expensive type of cameras, this shutter is usually in the form of a flat, spring actuated disk formed with an arcuate exposure control slot which is rapidly passed over the lens opening to make an instantaneous exposure. At the termination of the exposure, the shutter engages a stop and is suddenly brought to rest. It has been found, as is well known to those in the art, that when the shutter strikes such a stop, after the taking of an instantaneous exposure, the shutter may tend to rebound so that the exposure slot may again uncover the lens and thereby produce an overexposure or a double exposure.

In order to overcome this difficulty, the present invention provides a shutter rebound stop which positively and automatically locks the shutter at the termination of the exposure, thus preventing any rebound of the shutter. This rebound stop is particularly adapted for use on shutters of the single action type in which the shutter is alternately oscillated in opposite directions to make successive instantaneous exposures, the rebound stop being controlled by the shutter actuating member. It is to be understood, however, that such a rebound stop is not limited to shutters of the single action type, nor to the precise construction shown except in so far as is necessitated by the prior art or the scope of the appended claims.

In the present embodiment, 11 designates the front board of a camera on which a sector shaped shutter 12 of the single action type is oscillatably mounted on the stud 13. The shutter is provided with an elongated slot or exposure control opening 14 which is arranged to pass over the lens opening 15 to make an exposure, as is well known. The shutter travels through its maximum movement when an instantaneous exposure is made. A pair of lugs or pins 16 project outwardly from the board 11, and limit the movement of the shutter, as clearly illustrated in Figs. 1 and 2. When, however, a time exposure is to be made, an arm 17 is pivoted about the axis 18, by means of a member 19, to bring the lug 20 on the free end of the arm 17 into the path of the lug 21 on the shutter 12. When the shutter is now actuated the lug 20 engages the lug 21 and the shutter is held in position so that the slot 14 uncovers the lens opening 15, to permit the taking of time exposures. The above construction is well known to those in the art, and does not constitute a part of the present invention.

The shutter 12 is moved by means of a shutter actuating member, generally indicated by the numeral 22, which is of the shape best shown in Fig. 4, and is pivoted at one end thereof on a stud 23 secured to the shutter 12 adjacent the slot 14. A pair of arms 24 project laterally from the pivoted end of the member 22, and have the ends thereof bent to provide bent-up hooks 25 of the shape best shown in Fig. 5, which are arranged to engage the pins 16, as shown in Figs. 1 and 2 and hereafter more fully described, to prevent rebound of the shutter 12, as will be hereinafter more fully described.

A cam 27 is pivotally mounted on the board 11 by means of a stud 28. An arm 29, formed integral with the cam 27, projects outwardly therefrom and has a pin 30 mounted on the free end thereof. This pin projects upwardly through a longitudinally extending slot 31 formed in the actuating member 22, and is guided longitudinally in the slot by the side edges 32 thereof. A coil spring 33 has one end 34 thereof hooked over an ear 35 formed on the free end of the member 22, while the other end 36 of the spring is secured to the pin 31, thus yieldably connecting the member 22 and the cam arm 29. The member 22 and the arm 29 have the free ends thereof offset, as shown in Fig. 4, so as to clear the shutter 12 when they are rotated, as later described.

It is apparent that if the cam 27 is rotated, in either direction, about the stud 28, the arm 29 will move to bring the pin 30 into engagement with one of the sides 32 of the slot 31 and thus move the member 22 about its pivot 23 to disengage the hook 25 from its cooperating pin 16, as shown in dotted lines, Fig. 2. During this movement, however, the pin 30 is also moved longitudinally along the slot 31, as will be apparent upon comparing Figs. 2 and 3. This longitudinal movement of the pin 30 along the slot 31 elongates or stretches the spring 33, and also pivots the member 22 about its pivot 23 relative to the shutter 12. Further rotation of the cam 27 will now move the pin 30 adjacent the inner end of the slot 31, at which time the member 22 has been moved just slightly past dead center. When this point is reached, the pin 31 then remains substantially stationary, and the tensioned spring 33 quickly moves the shutter 12 and the member 22, as a unit, about the shutter pivot 13. During this unitary movement, the member 22 remains substantially stationary relative to the shutter 12.

As the shutter 12 and member 22 thus move about the stud 13, the leading hook 25 is in the path of one of the pins 16. Just prior to the engagement of the shutter 12 with the pin 16, the inclined under surface 35 of the hook 25 engages the pin 16 and thus lifts or cams the hook 25 over the pin 16. After this hook 25 has slid over the pin 16, the trailing edge 36 thereof drops back of the pin 16, as shown in Figs. 1 and 5 to lock the member 22 against rebound. This locking of the member 22 occurs substantially simultaneously with the engagement of the shutter 12 with the pin 16. As the member 22 is held against movement, and as this member is secured, by reason of the stud 23, to the shutter 12, the latter is also positionally locked and held against rebound. A pin 40 on the base 11 engages one of the spaced abutments or shoulder 41 formed on the cam 27 to limit the movement of the latter, as will be apparent upon an inspection of the drawing.

The other side of the cam 27 is provided with two straight plane surfaces 43 and 44 arranged to extend at right angles to each other. The surface 43 terminates in a shoulder 45 formed by the base of the arm 29, while the surface 44 terminates in a shoulder 46 formed by the projection 47. The vertex 48 of the surfaces 43 and 44 is slightly offset from the plane of a leaf-spring 49 which is mounted on a slide 50 which engages a washer 51 on the end of a shaft 52 to the outer end of which the operating trigger 53 is secured. The trigger 53 is slidable in a recess 54 formed in the member 55 set in the camera case as clearly shown in Fig. 1. A coil spring 56 is wrapped around the shaft 52 and is interposed between an annular shoulder or ring 57 and the trigger 53 to move the latter outwardly or to its inoperative position. The ring 57 is positioned at one end of the recess 54 adjacent the washer 51, as shown in Fig. 1. Such outward movement of the trigger is, however, limited by the engagement of the washer 53 with the inner end 58 of the member 55, Fig. 1.

When the trigger 53 is pressed, the washer 51 engages a bent-up lug or ear 59 formed on the adjacent end of the slide 50 to move the latter and the leaf-spring 49 inwardly to bring the end 60 of the leaf-spring into engagement with one of the surfaces 43 or 44. A further depression of the trigger 53 causes the end 60 to slide along one of the surfaces 43 or 44 until it engages the shoulders 45 or 46, as shown in dotted line Figs. 1 and 2.

Any further movement of the trigger 53 will now cause the cam 27 to rotate, as above described, to operate the shutter 12 to make an instantaneous exposure. The slide 50 is held in position on the board 11 by means of pins 63 and 64 which project outwardly from the board and through slots 65 and 66 in the slide 50, as clearly shown in the drawing. Upon releasing the trigger 53, the latter is returned to its inoperative position by means of the spring 56. The slide 50 is also slid or moved to its inoperative position, or to the right as viewed in the drawing, by means of a coil spring 67 one end of which is secured to the pin 64, while the other end is hooked over an ear 68 formed from the slide 50. The slide is moved to the right until the lug or ear 59 engages the washer 51 which thus limits the rightward movement of the slide 50.

It is thus apparent from the above description that the shutter 12 may be moved in either direction by merely depressing the operating trigger 53. As the shutter is moved its full limit, it engages one of the stop pins 16 which brings the shutter to rest. During this movement of the shutter, the shutter actuating member 22 is moved about its pivot 23 to bring one of the hooks 25 on the arms 24 into engagement with one of the stop pins 16, thus effectively and positively preventing rebound of the shutter 12, the advantages of which will be readily apparent to those in the art.

While one embodiment of the invention has been disclosed, it is to be understood that the inventive idea may be carried out in a number of ways. This application is, therefore, not to be limited to the precise details described but is intended to cover all variations and modifications thereof falling within the spirit of the invention and the scope of the appended claims.

I claim:

1. In a camera, the combination with a front board having a lens opening therein, a shutter pivotally mounted on said board and having an elongated exposure opening formed therein, of a shutter actuating member pivotally mounted on and movable bodily with said shutter, an arm pivotally mounted on said board, means for resiliently connecting said member and said arm, a cam surface on said arm, and means for engaging said cam surface to move said shutter.

2. In a camera, the combination with a front board having a lens opening therein, a shutter pivotally mounted on said board and having an elongated exposure opening formed therein, of a shutter actuating member mounted on said shutter, a spring on said member, an arm rockably mounted on said board and engaging said spring, said arm being movable to tension said spring to move said member and said shutter, a cam on said arm, and a reciprocating trigger adapted to engage said cam to operate said shutter.

3. In a camera, the combination with a front board having a lens opening therein, a shutter pivotally mounted on said board and having an elongated exposure opening formed therein, of a shutter actuating member mounted on said shutter, a spring having one end secured directly to said member, a cam pivotally mounted on said board, an arm on said cam secured to the other end of said spring, said cam being movable so that said arm will be moved relative to said member to tension said spring and move said member to operate said shutter, and a flexible means for operating said cam to move shutter in opposite directions.

4. In a camera, the combination with a front board having a lens opening therein, a shutter pivotally mounted on said board and having an elongated exposure opening formed therein, of an elongated shutter actuating member pivotally mounted at one end to said shutter, said member having a longitudinally extending slot formed therein, a cam pivotally mounted on said board, an arm on said cam having a portion thereof projecting through said slot, a spring connecting said member and said portion, a flexible slidable operating member for rocking said cam to move said shutter in opposite directions, and guide means for said operating member.

5. In a camera, the combination with a front board having a lens opening therein, a shutter pivotally mounted on said board and having an elongated exposure opening formed therein, of an elongated shutter actuating member pivotally mounted at one end to said shutter, said member having a longitudinally extending slot formed therein, a cam pivotally mounted on said board, angularly arranged surfaces on said cam, an arm on said cam having a portion thereof projecting through said slot, a spring connecting said member and said portion, a flexible operating member adapted to alternately engage said surfaces to first tension said spring to move the shutter in one direction and then tension the spring to move the shutter in the opposite direction, and guide means for said flexible member.

6. In a camera, the combination with a front board having a lens opening therein, a shutter pivotally mounted on said board and having an elongated exposure opening formed therein, of a shutter actuating member mounted on said shutter and movable as a unit therewith, a cam pivotally mounted on said board, an arm carried by said cam, means for resiliently connecting said member and said arm, means movable into engagement with said cam to operate said shutter, and means on said board arranged to engage said member to positively lock the latter to prevent rebound of said shutter.

7. In a camera, the combination with a front board having a lens opening therein, a shutter pivotally mounted on said board and having an elongated exposure opening formed therein, of a shutter actuating member pivotally mounted at one end thereof on said shutter, laterally extending arms on said member adjacent the pivot thereof, means for alternately moving said member in opposite directions to oscillate said shutter, and means engaging one of said arms when said shutter is moved in one direction and engaging the other arm when said shutter is moved in the opposite direction to prevent rebound of said shutter.

8. In a camera, the combination with a front board having a lens opening therein, a shutter pivotally mounted on said board and having an elongated exposure opening formed therein, of a shutter actuating member pivotally mounted at one end thereof to said shutter, a laterally extending arm on said member adjacent the pivot thereof, a cam mounted on said board, a spring operatively connecting said cam and said member, means for operating said cam to move said arm to oscillate said shutter, and a stud on said board for limiting the movement of said shutter and for engaging a cooperative portion on said arm to prevent rebound of said shutter.

9. In a camera, the combination with a front board having a lens opening therein, a shutter pivotally mounted on said board and having an elongated exposure opening formed therein, of a shutter actuating member pivotally mounted at one end thereof to said shutter, laterally extending arms on said member adjacent the pivot thereof, a hook portion on the free end of each of said arms, a cam pivotally mounted on said board, a laterally extended arm on said cam, a spring operatively connecting said arm and said actuating member, guide means for said arm on said actuating member, means for pivoting said cam to move said arm to first tension said spring and to then subsequently move said member to operate said shutter, and a lug on said board arranged to engage said shutter to limit the movement thereof and to simultaneously engage one of said hooks to prevent rebound of said shutter.

10. In a camera, the combination with a front board having a lens opening therein, a flat shutter pivotally mounted on said board and having an elongated exposure opening arranged concentrically with the pivot point of said shutter, of a shutter actuating member pivotally mounted on said shutter adjacent said exposure opening, laterally extending arms on said member adjacent the pivot thereof, an inclined hooked portion on each of said arms, a cam pivotally mounted on said board, a laterally extending arm on said cam adapted to engage and move said actuating member about its pivot, a spring operatively connecting said arm and said actuating member, guide means for said arm on said actuating member, means for pivoting said cam to first tension said spring and for pivoting said member on said shutter and for then moving said shutter and said arm as a unit about the pivot point of said shutter, and a lug on said board arranged to simultaneously contact said shutter to stop the latter and to engage said inclined hooked portion to lock both said member and said shutter against rebound.

JOHN B. NELSON.